United States Patent [19]

Periou

[11] 4,209,724
[45] Jun. 24, 1980

[54] PERMANENT MAGNET STATOR FRAME STRUCTURE FOR AN ELECTRIC MOTOR

[75] Inventor: Pierre Periou, Cergy, France

[73] Assignee: Compagnie Industrielle de Mecanismes, France

[21] Appl. No.: 946,660

[22] Filed: Sep. 28, 1978

Related U.S. Application Data

[62] Division of Ser. No. 774,023, Mar. 3, 1977, Pat. No. 4,131,989.

[30] Foreign Application Priority Data

Mar. 19, 1976 [FR] France .................................. 76 08113

[51] Int. Cl.$^2$ ........................................ H02K 21/38
[52] U.S. Cl. .................................. 310/154; 310/42; 310/254
[58] Field of Search .............. 310/154, 254, 258, 259, 310/42, 89, 90, 152

[56] References Cited

U.S. PATENT DOCUMENTS

| | | | |
|---|---|---|---|
| 3,100,270 | 8/1963 | Case et al. | 310/154 |
| 3,361,917 | 1/1968 | Stahly | 310/154 |
| 3,445,693 | 5/1969 | Cranshaw et al. | 310/154 X |
| 3,471,729 | 10/1969 | Latta et al. | 310/154 X |
| 3,600,615 | 8/1971 | Morita | 310/154 X |
| 3,626,219 | 12/1971 | Lease | 310/42 |

Primary Examiner—Mark O. Budd
Attorney, Agent, or Firm—Holman & Stern

[57] ABSTRACT

An electric motor comprising a rotor and a stator which comprises two magnetic blocks fixed in confronting relation on a frame of iron or magnetic sheet. The blocks are respectively fixed on two support elements which are interconnected by two covers of iron or magnetic sheet attached to the support elements on each side of the magnetic blocks. An end element for supporting the shaft of the rotor is disposed at each end of the frame. The covers are provided at their ends with positioning notches which are cooperative with bosses provided on the end elements.

7 Claims, 6 Drawing Figures

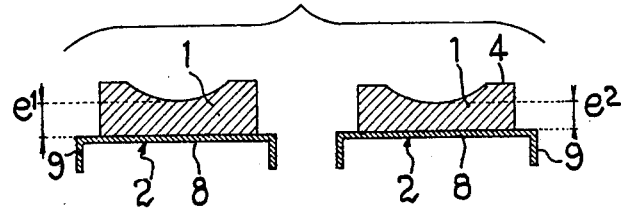
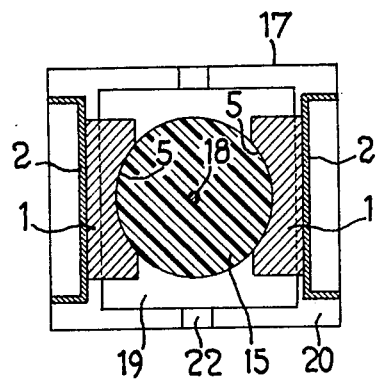
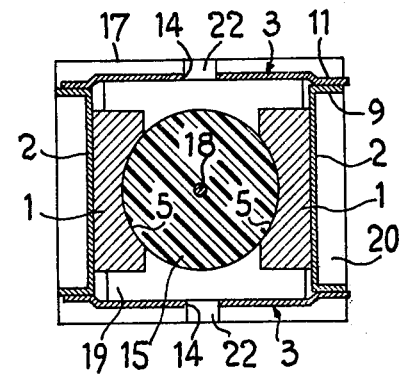
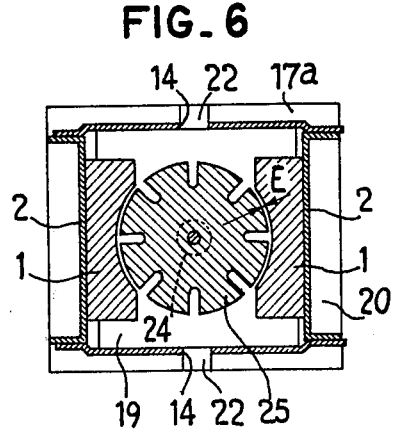

PERMANENT MAGNET STATOR FRAME STRUCTURE FOR AN ELECTRIC MOTOR

This application is a division of my application Ser. No. 774,023 filed Mar. 3, 1977 now U.S. Pat. No. 4,131,989.

The present invention relates to an electric motor of the type in which the stator has two magnetic blocks which are fixed, in confronting relation, to a frame of iron or magnetic sheet, comprising two support elements on each of which elements there is fixed a magnetic block and which are interconnected by two covers of iron or magnetic sheet which are attached to said elements on each side of the magnetic blocks, an end element for supporting the shaft of the rotor being disposed at each end of the frame. The invention is applicable in particular to dc motors employed in the automobile industry, for example for actuating windows and sliding roofs.

The motors of this type permit the precise positioning of the active faces of the ferrites or the like, irrespective of the manufacturing tolerances of the thickness of these ferrites, by the following assembly method: The stator is constructed by fixing two magnetic blocks respectively to two support elements of iron or magnetic sheet, applying the magnetic blocks on each side of a jig having a longitudinal axis and having a diameter equal to the diameter defined for the stator, attaching two covers of iron or magnetic sheet to the support elements, on each side of the magnetic blocks, so as to construct a frame, and withdrawing the jig and fixing at each end of the frame a rotor-supporting end element. Another advantage of this type of motor is that it provides a sufficient section of the magnetic circuit with thin sheets and is of light construction.

U.S. Pat. No. 3,626,219 shows a motor of the aforementioned type assembled in accordance with the aforementioned method. However, in this patent, the axis of the rotor must be positioned by geometric means which are not very convenient so that a large part of its interest as concerns the precise and simple positioning of the active faces of the ferrites is lost.

An object of the invention is to provide a motor of the aforementioned type in which the axis of the rotor is positioned simply, cheaply, and precisely.

According to the invention, there is provided a motor of the aforementioned type, wherein the covers are provided at their ends with positioning means which are cooperative with complementary positioning means provided on the end elements.

Such a motor is produced by a method of the aforementioned type which comprises supporting the axis of the jig at each end in a first end element, employing these two first end elements for positioning each cover before fixing it to the support elements, and then employing the covers for positioning the end elements supporting the shaft of the rotor.

Further features and advantages of the invention will be apparent from the ensuing description which is given solely by way of example with reference to the accompanying drawings in which:

FIGS. 3 to 5 are diagrammatic cross-sectional views of three successive stages of the production of the stator, and FIG. 6 is a cross-sectional view of the finished motor.

Figure 1:
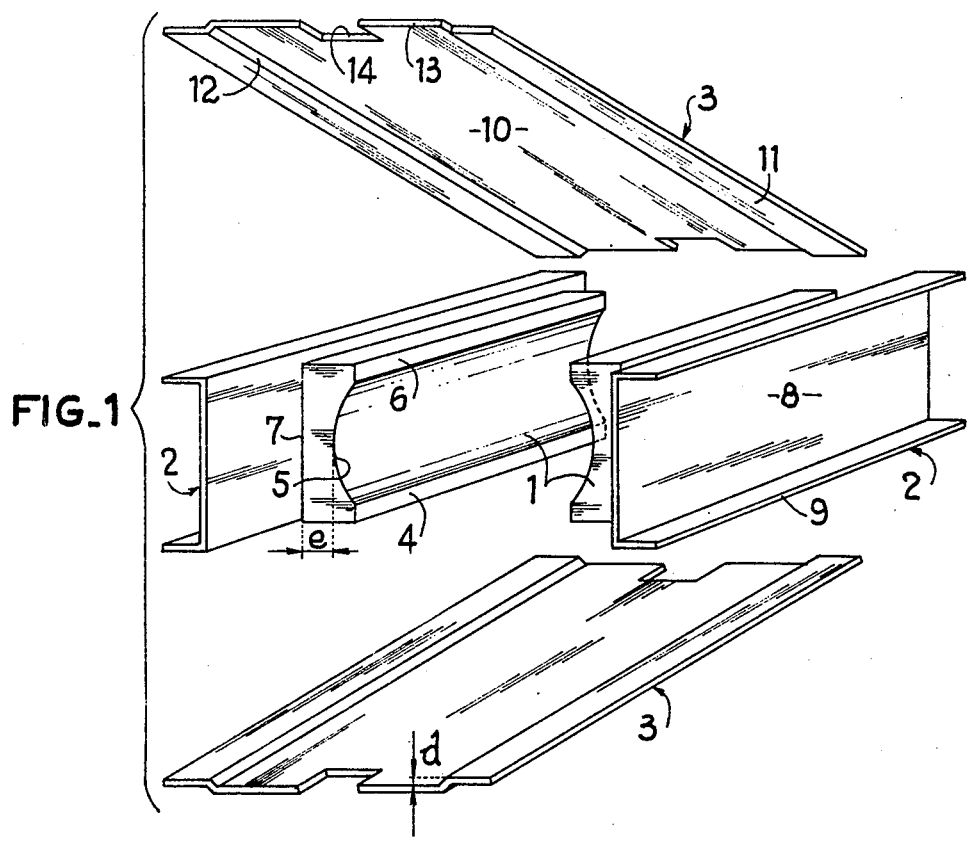
FIG. 1 is an exploded perspective view of a stator of a motor according to the invention.

The stator shown in FIG. 1 comprises two ferrites 1 which are identical and constitute inductive poles, two lateral identical metal section elements 2 serving as a support for the ferrites, and two identical metal plates 3 forming upper and lower covers. It is clear that the expressions "lateral", "upper" and "lower" are employed only for the convenience of description.

Each ferrite 1 is constituted by a block having an elongate rectangular-sided shape, in one of the large sides 4 of which member there is formed a part-cylindrical recess 5 which will determine the inside diameter of the stator. A narrow planar land or portion 6 extends along each side of the recess 5 throughout the length of the ferrite without having any operational function. The large side 7 of the ferrite opposed to the recess 5 is substantially planar. The side 7 and the part-cylindrical recess 5 are unground. The axis of the part-cylindrical surface 5 and the side 7 are roughly parallel. The nominal thickness of this ferrite, that is to say the distance e between the part-cylindrical surface 5 and the side 7 is, for example, of the order of 6 mm.

Each section element 2 is constituted by a thin blanked and press-formed sheet which has a rectangular U-shaped section and a thickness of the order of 1 mm to 1.2 mm, and includes a central web 8 and two perpendicular flanges 9 extending throughout its length. The height of a section element 2 is slightly greater than that of the ferrites 1 and its length is distinctly greater than the length of the ferrites, as will be seen hereinafter.

Each plate 3 has a generally rectangular shape and is blanked and press-formed and has the same thickness as the section elements 2. It has a planar central portion 10 having the same length as the section elements and, on each side throughout its length, a wing 11 in a plane which is parallel to but different from the plane of the portion 10. Each wing 11 is connected to the central portion 10 by an oblique shoulder 12. Each end edge 13 of the central portion 10 has a rectangular notch 14 in the middle thereof. The width of this portion 10 roughly corresponds to the distance between the section elements 2 and the width of the wings 11 is roughly equal to the width of the flanges 9 of the section elements 2.

Figure 2:
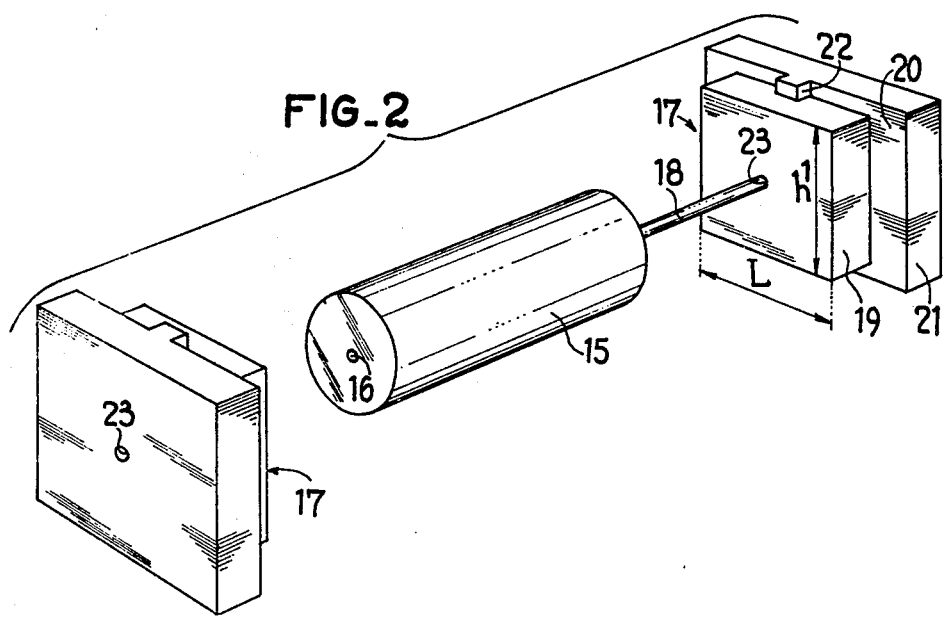
FIG. 2 is an exploded perspective view of a device for assembling the stator shown in FIG. 1.

The device shown in FIG. 2 comprises a jig constituted by a cylindrical mandrel 15 whose diameter is equal to the desired diameter of the stator and is provided with an axial passage 16, two identical end elements 17 and a cylindrical rod 18 having the same diameter as the passage 16 of the mandrel.

Each end element 17 has a first block 19 having a rectangular-sided shape whose height $h^1$ is exactly equal to the overall height, which is known in an exact manner, of each section element 2 increased by twice the distance d, which is also known in an exact manner, between the plane of the wings 11 of one plate 3 and the plane of the central portion 10 of the same plate.

The width L of the block 19 is slightly less than the minimum distance between the webs 8 of the section elements 2, once the stator has been constructed, bearing in mind tolerances of the thickness e of the ferrites, and its depth is less than half the difference between the length of a section element and the length of a ferrite 1.

The block 19 projects from the central portion of a large side 20 of a second block 21 which has a rectangular-sided shape, the dimensions of this side 20 roughly corresponding to those for the cross section of the finished stator. A rectangular-sided boss 22, whose depth and width are equal to the corresponding dimensions of each notch 14, projects from the side 20 of each end element 17 in the middle of the width of each of the upper and lower sides of the block 19. The large side, that is to say respectively the upper and lower side of each boss 22, is in the same plane as the corresponding side of the block 21.

Each end element 17 is provided with an aperture 23 which passes through the centre of the blocks 19 and 21. Fixed in the aperture 23 of one of the end elements is the rod 18 which projects from the block 19 of this end element by a length exceeding the length of the mandrel 15.

To produce an electric dc motor by means of the device just described, the procedure is as follows:

First, the side 7 of each ferrite is adhered to the web 8 of a section element 2 on the side of the latter opposed to the flanges 9. Each ferrite 1 is easily centered transversely and positioned longitudinally on the corresponding section element 2 but, bearing in mind the poor manufacturing tolerances of the thickness of the ferrite (of the order of half a millimeter), the part-cylindrical surface 5 of the ferrite is spaced from the section element 2 by a poorly determined distance. Thus the distances $e^1$ and $e^2$ of FIG. 3 can differ by a large amount with respect to the desired air-gap for the motor.

Then (FIG. 4) the mandrel 15 is mounted on the rod 18 the free end of which is engaged in the aperture 23 of the other end element 17 until the mandrel 15 is in contact with the two blocks 19 by its two end faces. The two section elements 2, carrying the ferrites 1 on each side of the mandrel 15, are then brought in position so that the ferrites are applied against the mandrel by their recesses 15 in two diametrally opposed positions. The desired position of the two active faces 5 of the ferrites 1 is then perfectly determined by construction, irrespective of the distances $e^1$ and $e^2$, that is to say irrespective of errors of manufacture in the thickness of the ferrites. The section elements 2 abut by their end faces against the sides 20 of the blocks 21.

Thereafter (FIG. 5), the two plates 3 are brought into contact with the upper and lower sides of the two blocks 19, the bosses 22 being received without clearance in the respective notches 14 of these plates. Then, each of the wings 11 is fixed by any suitable means, such as spot welding, to the confronting flange 9. This rigidly interconnects the two section elements 2 and finally fixes their relative position. Note that there may be clearances in the lateral direction between the blocks 19 and the section elements 2 and that the plates 3 are normally off-centre with respect to the section elements 2. On the other hand, the plates 3 are perfectly centered with respect to the end elements 17 and consequently with respect to the faces 5 of the ferrites. Moreover, the plates 3 are in contact with the upper and lower sides of the blocks 19 throughout the width of the latter, since the height of the section elements 2 is known in a very precise manner.

Lastly, the two end elements 17 and the mandrel 15 are withdrawn and there is disposed at each end of the stator an end element $17^a$ which is identical to the end element 17 but in which the aperture 23 is replaced by a suitable bearing 24. Extending through the two new end elements is the shaft of rotation of the rotor or inductor 25 of the motor (for example an eight-pole rotor), which results in the configuration shown in FIG. 6. One end element $17^a$ carries the brushes of the motor, and the other has the output shaft of the motor extending therethrough. For this reason, the ferrites 1 are longitudinally offset in the direction of this other end element. By construction, owing to the introduction of the bosses 22 of the end elements $17^a$ in the notches 14 of the plates 3, the axis of the rotor 25 is perfectly positioned, since it coincides with the axis of the mandrel 15 in the course of production of the stator and the air-gap E exactly corresponds to its nominal value throughout the length of the motor for the same reason.

In order to construct the motor, the active faces of the ferrites were therefore positioned, and then the covers were positioned with respect to the ferrites and then these covers were employed for positioning the rotor-supporting end elements. All these operations are carried out with respect to the ferrites themselves, independently of the position of the section elements 2.

In addition to their function for positioning the section elements 2 then the axis of the rotor, the two plates 3 also serve as protecting covers against entry of impurities into the motor. Further, they define with the section elements 2 a transverse circuit closing the magnetic flux which extends throughout the length of the motor. This enables using only thin sheets for constructing the stator and consequently results in an extremely light motor.

By way of a modification, the webs 8 of the section elements 2 and the corresponding face 7 of the ferrites may be curved in a part-cylindrical form, these ferrites then having parallel faces. Moreover, the two notches 14 in each plate 3 may be made different for positioning end elements $17^a$ which differ from each other by some technical characteristic.

Also by way of a modification, the flanges 9 of the section elements 2 may extend inwardly of the motor, so as to reduce the overall size and in this case may even be fixed directly to each other, without having to use covers such as the plates 3. If these flanges are fixed to each other, by welding, a copper mandrel may be employed which acts as a welding electrode. In the case where the section elements 2 are fixed directly to each other, the end elements can no longer be employed for positioning the axis of the rotor. It is then necessary to employ conventional means for defining the geometric axis of the rotor by means of the hollow cylinder defined by the faces 5 of the stator. Such means are well known in the art and have no need to be described in more detail.

The ferrites may of course be replaced, by way of a modification, by other materials having the desired magnetic properties and their fixing to the section elements 2 can be achieved other than by adhesion, for example by suitable fasteners. Likewise, the plates 3 may be secured to the section elements by methods other than welding, for example by riveting or screwing.

Having now described my invention what I claim as new and desire to secure by Letters Patent is:

1. In an electric motor comprising a stator and a rotor having a shaft, the stator comprising a frame of a material selected from a group consisting of iron and magnetic sheet, two magnetic blocks fixed in confronting relation on the frame, the frame comprising two support elements on each of which elements there is fixed a respective one of the magnetic blocks, two covers of a material selected from a group consisting of iron and magnetic sheet attached to the support elements on each side of the magnetic blocks and interconnecting the support elements, an end element supporting the shaft of the rotor disposed at each end of the frame, the following improvement: the support elements are each constituted by a U-section sheet having a central web on which a respective one of said magnetic blocks is fixed and two parallel planar flanges, and the two covers each have planar lateral portions in contact with and fixed to said flanges; there are provided positioning means at opposite ends of the covers and positioning means on the end elements which are complementary to and cooperative with the positioning means of the covers, the positioning means being operative to position the end elements and the covers relative to one another in a direction parallel to said flanges; and, in each transverse section of the stator, a first one of said magnetic blocks has a first radial thickness, a second one of said magnetic blocks has a second radial thickness, each cover being offset in a direction parallel to said flanges by a distance equal to the difference between said first thickness and said second thickness.

2. A motor as claimed in claim 1, wherein the positioning means comprise bosses on the end elements and conjugate notches in opposite ends of the covers.

3. A motor as claimed in claim 1, wherein the lateral portions of the covers are magnetically connected to the two flanges throughout the length of the covers.

4. A motor as claimed in claim 3, wherein the lateral portions are fixed to the two flanges at a plurality of points.

5. A motor as claimed in claim 3, wherein the lateral portions are fixed to the two flanges along a continuous line on each side of the support elements.

6. A motor as claimed in claim 1, wherein the end elements have further positioning means for positioning the end elements and a portion of the covers intermediate said flanges relative to one another in a direction perpendicular to said flanges.

7. A motor as claimed in claim 6, wherein said further positioning means comprise further bosses on the end elements, end regions of said cover intermediate portions lying over the respective further bosses.

* * * * *